United States Patent [19]

Iyer et al.

[11] Patent Number: 5,179,699
[45] Date of Patent: Jan. 12, 1993

[54] PARTITIONING OF SORTED LISTS FOR MULTIPROCESSORS SORT AND MERGE

[75] Inventors: Balakrishna R. Iyer, Fremont, Calif.; Gary R. Ricard, Rochester, Minn.; Peter J. Varman, Houston, Tex.

[73] Assignee: International Business Machines Corporation, Armonk, N.Y.

[21] Appl. No.: 297,634

[22] Filed: Jan. 13, 1989

[51] Int. Cl.⁵ .......................... G06F 7/06; G06F 7/16
[52] U.S. Cl. .................... 395/650; 395/200;
395/800; 364/962.2; 364/962.3; 364/931.4;
364/DIG. 2; 340/146.2
[58] Field of Search ... 364/200 MS File, 900 MS File;
340/146.2; 395/650, 200, 800

[56] References Cited

U.S. PATENT DOCUMENTS

| | | | |
|---|---|---|---|
| 4,030,077 | 6/1977 | Florence et al. | 364/900 |
| 4,210,961 | 7/1980 | Whitlow et al. | 364/200 |
| 4,575,798 | 3/1986 | Lindstrom et al. | 364/200 |
| 4,595,995 | 6/1986 | Alles | 364/900 |
| 4,794,521 | 12/1988 | Zeigler et al. | 364/200 |
| 4,797,815 | 1/1989 | Moore | 364/200 |
| 4,799,152 | 1/1989 | Chuang et al. | 364/200 |
| 4,843,542 | 6/1989 | Dashiell et al. | 364/200 |
| 4,862,356 | 8/1989 | Van Trigt | 364/200 |
| 4,920,487 | 4/1990 | Baffes | 364/200 |
| 4,951,193 | 8/1990 | Muramatsu et al. | 364/200 |
| 4,991,134 | 2/1991 | Ivsin | 364/900 |

OTHER PUBLICATIONS

"A Benchmark Parallel Sort for Shared Memory Multiprocessors" R S Francis and I D Mathieson, IEEE Transactions on Computers, vol. 37, No. 12, Dec. 1988.
"An Efficient Percentile Partitioning Algorithm for Parallel Sorting" B R Iyer, G R Ricard, P J Varman RJ 6954 (66060) Aug. 9, 1989 Computer Science Research Report.
"Parallel Sorting Algorithms for tightly coupled multiprocessors", M J Quinn, Parallel Computing 6 (1988) 349-357, #3, Mar. 1988.

*Primary Examiner*—Thomas C. Lee
*Assistant Examiner*—William M. Treat
*Attorney, Agent, or Firm*—Bradley A. Forrest; Steven W. Roth

[57] ABSTRACT

Any number of sorted lists are efficiently partitioned into P lists, where P represents the number of processors available to sort the resulting lists. When given a large list to sort, the list is initially divided into P lists, and each processor sorts one of these lists. The lists are then exactly partitioned so that each of the elements in the new consecutive partitioned lists have values no smaller than any of the elements in the lists before it, nor larger than any of the elements in the list following it. Partitioning is done by P−1 processors. Each of the processors successively considers selected rows of elements from the sorted lists, and moves a partition boundary based on an element magnitude requirement and a partition size requirement. The new partitioned lists are then merged by the P processors, and simply strung together to provide a sorted list of all the elements.

16 Claims, 10 Drawing Sheets

```
---------------------------------------------------------------1-
ACQUIRE m SORTED SEQUENCES a(r,j) OF LENGTH N(r)
WHERE 1<=r<=m AND 1<=j<=N(r).

ACQUIRE THE NUMBER OF PARTITIONS, h, INTO WHICH
SEQUENCES a(r,j) ARE TO BE DIVIDED.

LET kmax = 0.
---------------------------------------------------------------2-
FOR EACH SORTED SEQUENCE: r=1 TO m.
    ---------------------------------------------------------------3-
    LET k(r)=floor(log2(N(r)))+1 WHERE log2 IS THE
    BASE 2 LOGARITHM FUNCTION.
    ---------------------------------------------------------------4-
      *                                                        *
       *  IS k(r) GREATER THAN kmax?                          *
    YES *                                                    *  NO
    -------------------------------------------------5-|--------
    LET kmax=k(r).
    ---------------------------------------------------------------6-
    LET M(r)=2**k(r).
---------------------------------------------------------------7-
FOR EACH DESIRED PARTITION: i=1 TO h-1.
    ---------------------------------------------------------------8-
    FOR EACH ITERATION NEEDED TO CALCULATE THE FINAL
    PARTITION: p=0 TO kmax-1.
        ---------------------------------------------------------------9-
        CLEAR SET S0.
        ---------------------------------------------------------------10-
```

FIG. 2a

```
FOR EACH SORTED SEQUENCE: r=1 to m.
----------------------------------------11-
LET q(r)=p-kmax+k(r).
----------------------------------------12-
 *                                        *
 *   IS q(r) GREATER THAN OR EQUAL TO 0?  *
YES *                                     * NO
----------------------------------------13-
ADD r TO SO. THIS IDENTIFIES THE
SEQUENCES WHICH PARTICIPATE IN THE
PARTITIONING FOR THIS ITERATION OF p.

LET Mp(r)=2**(kmax-p+1). THIS IS THE
DISTANCE BETWEEN ELEMENT INDEXES AT
ITERATION p.

LET Np(r)=M(r)-Mp(r)*floor((M(r)-N(r)-
1)/Mp(r))-Mp(r). THIS IS THE FINAL EL-
EMENT IN EACH SEQUENCE AT ITERATION p.
----------------------------------------14-
 *                                        *
 *   IS p EQUAL TO 0? (IS THIS THE FIRST  *
       ITERATION FOR THIS PARTITION?)
YES *                                     * NO
----------------------------------------15-
FOR EACH SORTED SEQUENCE: r=1 TO m.
----------------------------------------16-
LET I(r)=0. THIS IS THE BASIS
           STEP AT p=0.

```
LET amax=-INFINITY (OR MINIMUM MACHINE VALUE).
----------------------------------------------18-
FOR EACH r WHERE r IS A MEMBER OF SET S0:
  ----------------------------------------------19-
  • IS i(r) GREATER THAN 0 AND IS a(r,i(r))
         GREATER THAN amax?
  YES •                                        • NO
  --------------------------------------20-------
  LET amax=a(r,i(r)).
//////////////////////////////////////////////////
----------------------------------------------21-
CLEAR SET S3.
LET s=0.
LET asum=0.
LET bsum=0.
LET Mmax=2**kmax.
----------------------------------------------22-
FOR EACH r WHERE r IS A MEMBER OF SET S0:
  ----------------------------------------------23-
  •      IS i(r) LESS THAN Np(r) AND IS         •
         a(r,i(r)+Mp(r)) LESS THAN amax?
  YES •                                        • NO
  --------------------------------------24-------
  ADD r TO SET S3. THIS IS THE SET OF
  SEQUENCES WHICH CONTAIN ELEMENTS IN
  THE LOWER PARTITION THAT ARE LESS
  THAN THE MAXIMUM VALUE THAT CURRENT-
  LY RESIDES IN THE UPPER PARTITION.
```

FIG. 2c

LET s=s+1. THIS IS THE NUMBER OF
ELEMENTS IN SET S3 AND ALSO THE
NUMBER OF ELEMENTS THAT MUST BE
MOVED INTO THE UPPER PARTITION TO
SATISFY THE MAGNITUDE REQUIRMENT.

---25---

LET num=l*Np(r)-h*l(r).

LET den=h*Mp(r).

LET div=floor(num/den).

LET asum=asum+div.

LET bsum=bsum+(Mmax/Mp(r))*(num-den*div).

---26---

LET n=asum+floor((2*bsum+h*Mmax*sign(bsum))/
(2*h*Mmax)). THIS IS THE NUMBER OF ELEMENTS THAT
MUST BE MOVED INTO THE UPPER PARTITION FOR
CORRECT PARTITION SIZES.

---27---

IS s EQUAL TO n? (ARE THE NUMBER OF
ELEMENTS THAT MUST BE MOVED INTO
THE UPPER PARTITION BECAUSE OF
THE MAGNITUDE REQUIREMENT
EQUAL TO THE NUMBER THAT
MUST BE MOVED THERE
BECAUSE OF THE
PARTITION-SIZE
REQUIREMENT?)

YES                                                          NO
---28---                                                  ---30---

FIG. 2d

PARTITIONING OF SORTED LISTS FOR MULTIPROCESSORS SORT AND MERGE

BACKGROUND OF THE INVENTION

The present invention relates to the use of multiple processors to merge sorted lists, and in particular to the efficient partitioning of sorted lists to make use of all the processors during the final sort and merge of the lists.

The sorting of lists into an order of ascending or descending values making maximum use of multiple processors during the entire sorting process has been the subject of much study. It is a relatively simple process to initially divide the list of N elements into P nearly equal sized lists for each of P processors to individually sort. Once these lists are sorted, they must be merged together into one list. It is desirable that the time required to perform this merge be linear with respect to the number of processors, P (i.e. 2 processors yield twice the performance of 1 processor, 4 processors yield quadruple the performance of 1 processor). In other words, with N total elements to be merged using P processors, the time to merge should be proportional to N/P. This is where the prior art has run into difficulties. The time to merge using the most efficient prior art method is proportional to $N/P*\log_2 P$. To illustrate, consider what happens to merge performance as a computer system is upgraded from 2 to 4 processors. If the merge performance is linear then the merge time goes from N/2 to N/4 for a twofold performance increase. If the merge performance is $N/P*\log_2 P$ then the merge time goes from $N/2*\log_2 2 = N/2*1 = N/2$ to $N/4*\log_2 4 = N/4*2 = N/2$ for no performance increase even though two additional processors were used!

One reference, Akl, S. G., and Santroo, N., "Optimal Parallel Merging and Sorting Without Memory Conflicts" IEEE Trans. on Computers, Vol. C36, No. 11, Nov. 1987, pp. 1367-69, can work on two lists at a time, finding the value of the element where the sum of the number of elements in the two lists below the value is equal to the sum of the number of elements in the two lists above the value. It is then a simple matter to partition the two lists at that value, and one processor sort the combined lists below the partition, while the other processor sorts the combined lists above the partition. The two lists are then concatenated, or simply strung together to form one new list sorted in the correct order. If there are more than two lists, the process is done simultaneously for each pair of lists, then one is left with half the number of lists. These lists are partitioned again to generate two pair of lists as above, but, since the number of lists to be merged is now only half the original quantity, each of the two pair of lists must be partitioned yet another time so that enough pairs of lists are available to keep all the processors busy. A pair of lists is first partitioned in half and then each half is partitioned to yield a one-quarter and three-quarter partition so that each processor has a pair of lists to merge. This clearly is inefficient since multiple merge phases are necessary to generate the final sorted list. If it were possible to partition all the lists at once into P partitions such that each processor could perform only a single merge phase, then a significant performance increase would result and the desired sorted list would be generated by simple concatenation of the merged partitions. This has been attempted by partitioning based on sample sort keys. Another reference, Quinn, M. J., "Parallel Sorting Algorithms for Tightly Coupled Multi-processors", Parallel Computing, 6, 1988, pp. 349-367., chooses partitioning key values from the first list to be merged such that these keys will partition the first list into P partitions. These keys are then used to partition the remaining lists as close as possible to the sample key values. This leads to a load imbalance among processors due to the approximated partitions and a corresponding degradation from linear merge performance. Furthermore, if the data in the lists is skewed from random distribution (a common occurrence in relational data base operations), then the resulting approximate partitions can be greatly differing in size thereby exacerbating the load imbalance problem. Even with randomly distributed data the literature indicates that no performance is gained beyond 10 processors when sorting 10,000 records. This is attributed to load imbalances from approximate partitioning.

SUMMARY OF THE INVENTION

Any number of sorted lists are efficiently partitioned into P lists, where P represents the number of processors available to sort the resulting lists. When given a large list to sort, the list is initially divided into P lists, and each processor sorts one of these lists. When the lists are then partitioned in accordance with the present invention, each of the elements in the new lists created by partitioning have values no smaller than any of the elements in the partitions before it, nor larger than any of the elements in the partitions following it. The lists in each partition are then merged by the P processors, and simply strung together to provide a sorted list of all the elements.

The first partition consists of all the elements of all the lists which are below a certain value which results in the partition containing N/P elements. The second partition consists of all the elements at or above the first value, but below a second higher value which results again in the partition containing N/P elements. This continues until the Pth partition contains the highest value, and again, N/P elements. The lists in a partition are merged by a single processor, each of P processors being assigned the task of merging the lists in one partition. When the merge processing is complete, the merged lists are simply strung together to produce the final sorted list. As can be seen, the time intensive merging operation is performed by all available processors simultaneously, rather than in several partition and merge operations as in the prior art. Also each partition is nearly the same size so no processor load imbalance occurs as in the prior art.

To determine the partition boundaries in the preferred embodiment, we begin with a set of null lists. A calculation is performed to find the approximate middle element of each list and this row is added for consideration with the initial partition prior to the single element in each list. The maximum element of those elements immediately prior to the partition in each list is determined. The number of elements immediately following the partition which are less than this maximum element is also determined. This value is the number of elements which must be moved from the bottom partition into the top partition to assure that all the elements of the top partition are less than all the elements of the bottom partition. This criteria is hereafter referred to as the magnitude requirement.

Next, the number of elements that must be moved from the bottom partition into the top partition in order to assure that the size of the partitions are in the correct proportion is determined. This criteria is hereafter referred to as the partition-size requirement. These two values, the number of elements that must be moved to guarantee the magnitude requirement, and the number of elements that must be moved to guarantee the partition-size requirement, are then compared. The comparison will determine whether elements need be moved from the top partition into the bottom partition or viceversa in order to guarantee both the magnitude and partition-size requirements. If elements need be moved from the top partition into the bottom then the partition is adjusted such that the appropriate number of largest elements from the top partition are moved into the bottom. If elements need be moved from the bottom partition into the top then the partition is adjusted such that the appropriate number of smallest elements from the bottom partition are moved into the top. The partition is now correct for the elements that are currently being considered in the lists.

In the next step, two more rows, each halfway between the first and last rows, and the middle row are added for consideration, and the maximum of those elements immediately prior to the partition boundary is again determined. The process continues as described above, and the result is a correct partition for the elements that are currently being considered in the lists. During each of the succeeding steps, new rows are added for consideration, until finally, after $\log_2 n$ steps (where n is the number of elements in the longest list to be partitioned), all the rows have been added. After this final iteration, the partition is finally determined.

p−1 processors perform this operation in parallel to find P−1 partition boundaries, and hence define P partitions each containing one or more lists for merging. Each of the P partitions may contain elements from one or more of the original sorted lists. The operation is the same in each of the processors, but a weighing factor is applied to the size requirement, and each processor ends up moving different elements in each of the steps, so that the resulting partition boundaries calculated are different.

Since the number of elements in each resulting partition differs from the others by at most 1 element, work is divided evenly between the processors for the final merge phase. In the final merge phase, each of the P processors merges the lists in its partition to form P sorted lists. The lists are then simply strung together to form the final sorted lists. Maximum use of processors is obtained, and hence a near linear improvement in sort time is obtained when adding further processors.

DESCRIPTION OF THE DRAWINGS

FIG. 2A, 2B, 2C, 2D, 2E, 2F, and 2G when placed end to end represent a flow diagram of the method performed by the multiprocessor computer system of FIG. 1.

DETAILED DESCRIPTION

A high level description of the invention is first presented. An example which shows how a partition takes place step by step in one processor is also described in this section of the specification.

Figure 1:
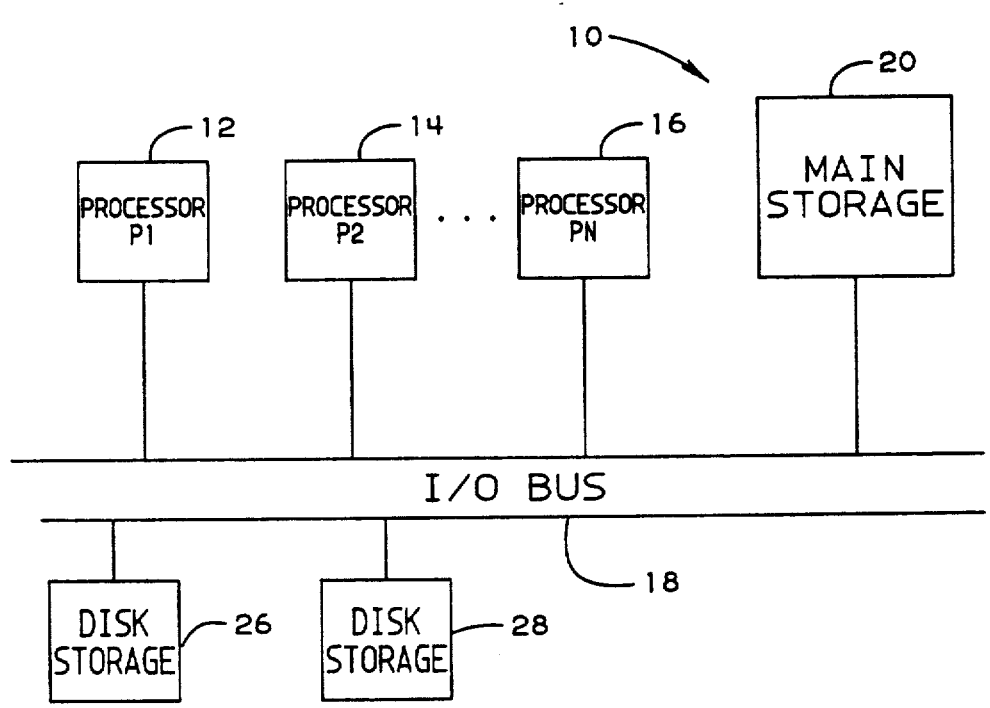
FIG. 1 is a block diagram of a multiprocessor computer system for performing the partitioning method of the present invention.
Figure 2E:
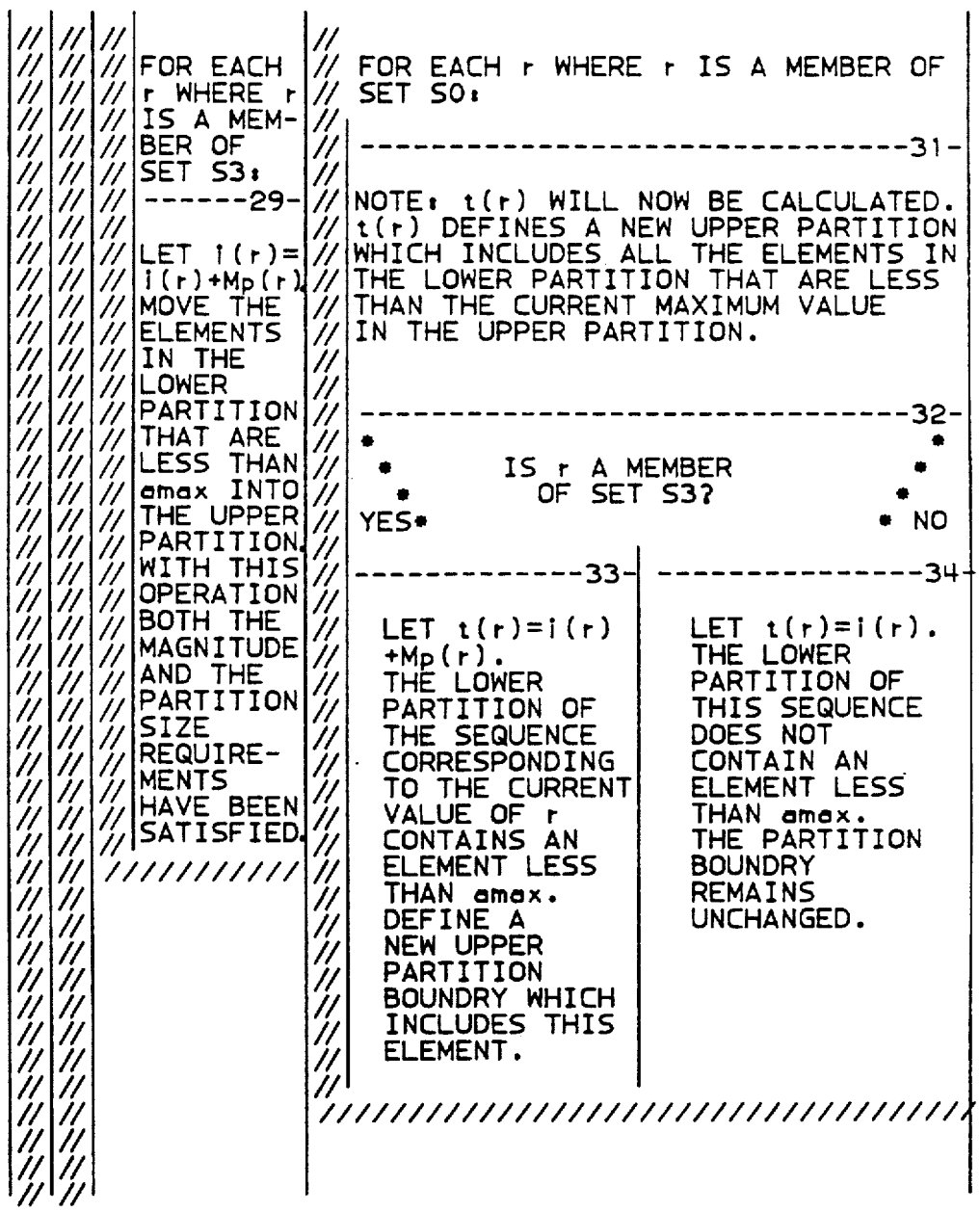
Figure 2F:
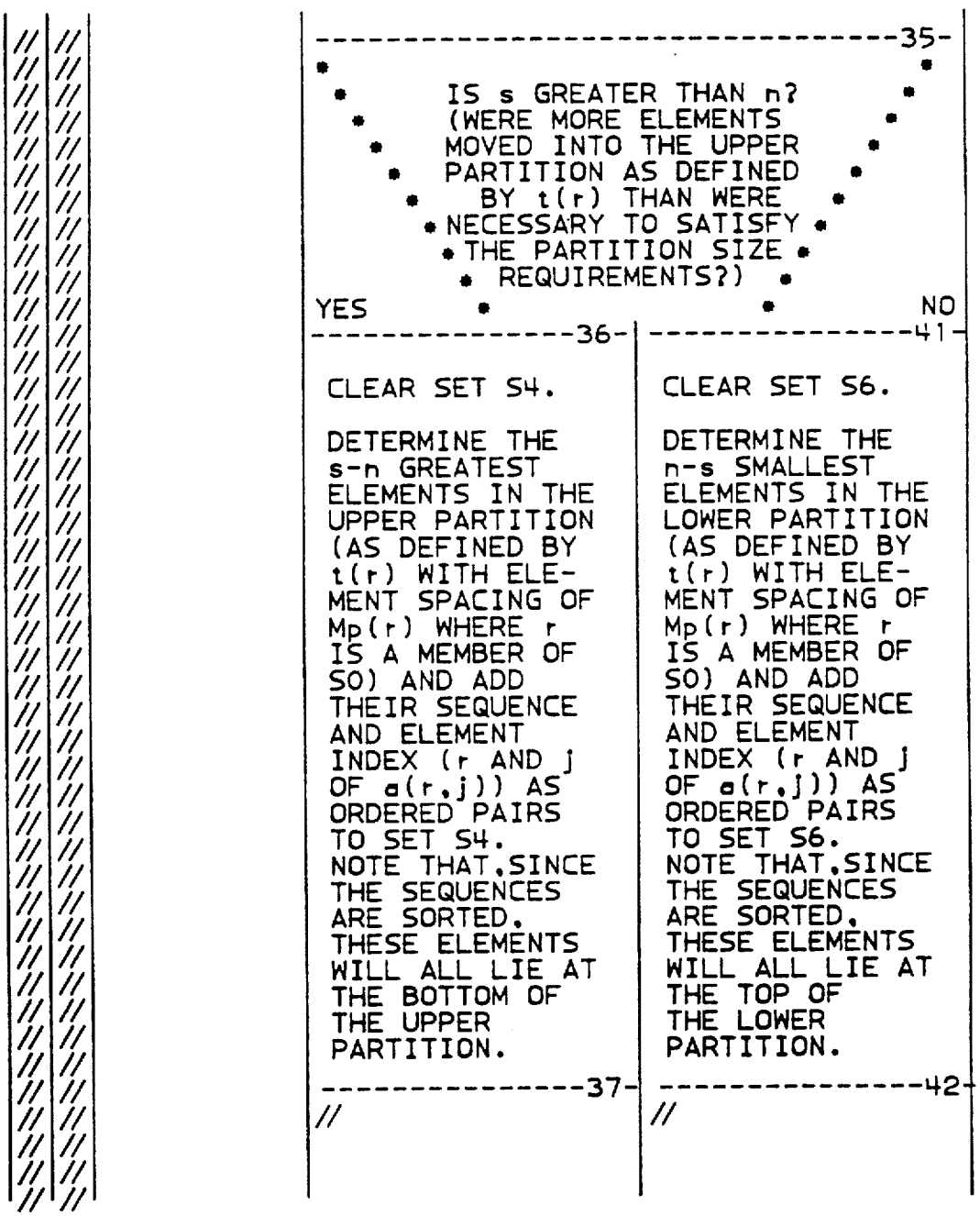
Figure 2G:
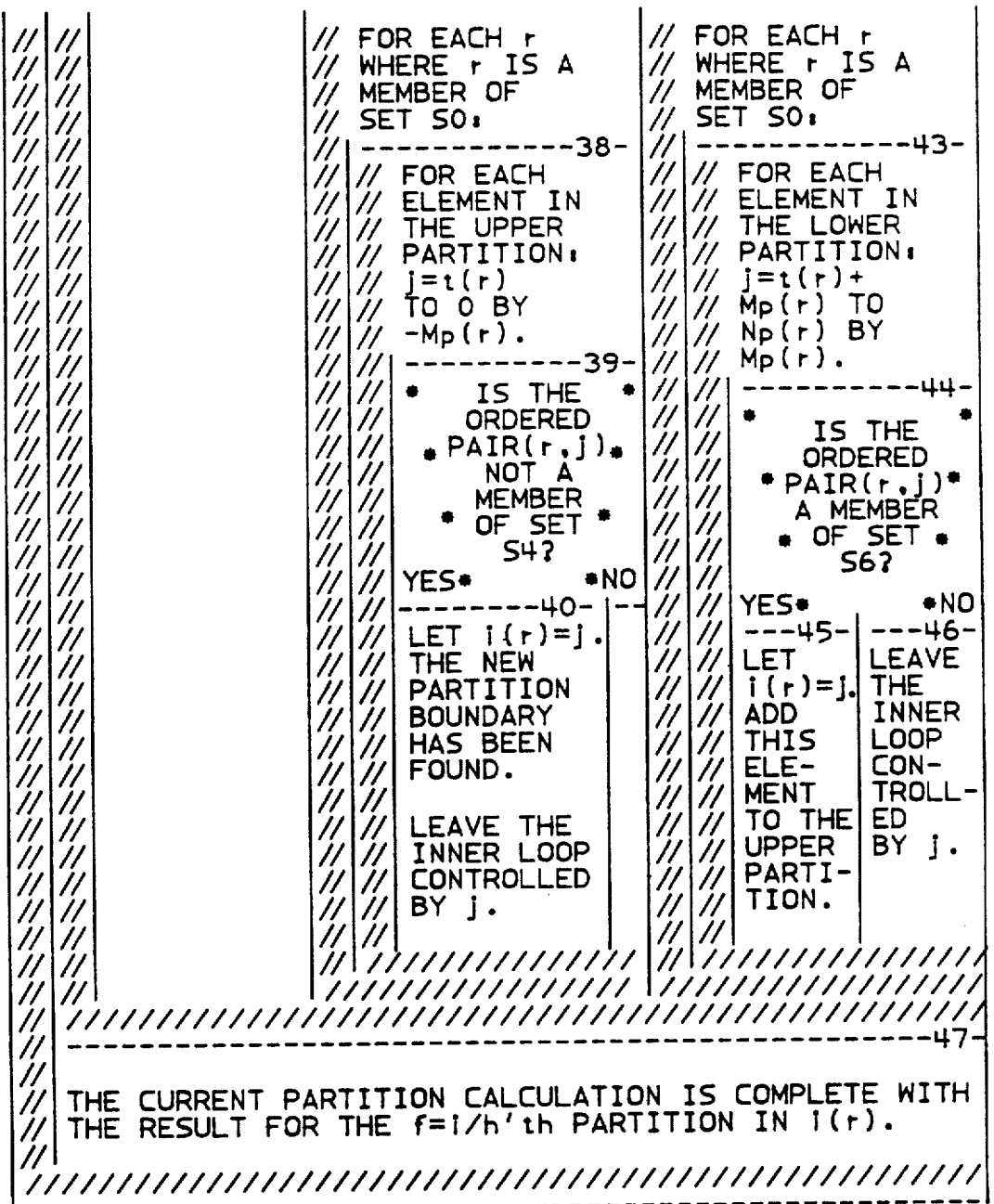

One computer system which can take advantage of the method of partitioning several sorted lists is shown generally at 10 in FIG. 1. A plurality of processors, P1, P2 . . . through PN numbered 12, 14, and 16, are shown coupled to an I/O bus 18. Each processor has access to a main storage 20, either by direct coupling, or through the I/O bus 18. Data, comprising lists to be sorted, is stored in various direct access storage devices, DASD 26 and 28, also coupled to bus 18. Each processor will request data from a DASD to be transferred to main storage 20. It will be recognized that the invention is not dependent on one particular arrangement, and that other parallel processor architectures are also well suited to implement the present invention. Loosely coupled processors, each having its own separate main storage, or a series of main storages with caches, are also candidates for implementation of the present invention.

When sorting a large list by multiple processors, the goal is to perform the sort in the shortest period of time. This is best accomplished by dividing the work as equally as possible between the multiple processors. The first step is to divide the list into multiple equal sized lists. If the items are represented by addresses, one processor usually provides a list of addresses to each of the other processors. The number of such lists should be equal to the number of processors available. Each processor then takes a list and performs a normal sort of the list so that all the items in the list are in a desired order. One such order is an ascending order based on the value of the digital representation of the items. Many such sort routines are commonly practiced today, and will not be discussed further.

The second step in the sorting process is to divide the lists into partitions. Each of the partitions will contain nearly the same number of elements or items. There should be one partition of elements for each available processor. The first partition will contain elements from many of the original lists, but all such elements will be less than the elements in the next partition. This will also be true for each of the succeeding partitions.

It is the task of the partitioning processors to find a partition boundary. A partition boundary is identified by a list identifier, and an index value into the list for each of the lists. For example, given three lists each having 21 elements, a partition boundary may be identified as: List 1, index 7, List 2, index 9, List 3, index 5. This means that all elements above and including the 7th element in the first list, all elements above and including the 9th element in the second list, and all elements above and including the 5th element in the third list are in the first partition. This would put one-third of the elements in the first partition since a partition boundary defines the last element of the partition. There are 21 elements in the first partition, and there would 21 elements in each of the next two partitions.

Only two partition boundaries need to be determined, and it only requires two processors to perform the partitioning when three processors are available to perform the entire sort. The first processor determining the first partition boundary will then pass the boundary definition on to the second processor determining the second boundary. This will clearly define the second partition to the second processor when the second processor has determined the second boundary. The second processor further passes on the second boundary definition to the third processor to define the third partition. The two boundary determinations should occur at about the same time, as the number of steps in both determinations is substantially the same, and both processors are operating in parallel.

Each of the three processors then performs a merge operation. This common operation essentially consists of starting with all the elements from one of the lists of its partition, and inserting the elements from the remaining lists in the partition in the appropriate order.

EXAMPLE

The method used to partition the lists is best shown with an example. Generally, a number of iterative steps are performed on selected elements from the presorted lists. Each step adds elements from the lists between the existing elements under consideration. Thus, the new elements in an upper partition always belong in the upper partition since they are always no greater than the partition boundary element from the previous iteration. The elements in question are those which immediately follow the partition boundary since they may be less than the boundary elements of the upper partition.

The method begins with one element in each list. These tiny new lists are partitioned and then new elements are added between the current elements. This run is then partitioned and new elements are added between these current elements. The iterative process continues until all the elements in each sequence have been processed. During the partitioning, the boundary is moved to include elements above or below the prior partition boundary. The elements are moved based on their magnitude, and also based on the number of elements already in the partition. The last characteristic is what permits one to establish multiple partitions. The number of elements factor is simply modified based on the number of elements desired in the partition. For a two way partition, a multiplier of one-half is used. For a three way partition, one-third is used for the first partition and two-thirds is used for the second. The same holds for a larger number of partitions.

Given the following sequences of lists a, b, c,

| Index | a | b | c |
|---|---|---|---|
| 1 | 1 | 6 | 6 |
| 2 | 2 | 6 | 6 |
| 3 | 3 | 22 | 6 |
| 4 | 4 |  | 7 |
| 5 | 5 |  | 7 |
| 6 | 6 |  | 7 |
| 7 | 7 |  | 16 |
| 8 | 8 |  | 17 |
| 9 | 8 |  | 18 |
| 10 | 8 |  | 18 |
| 11 | 8 |  | 18 |
| 12 | 20 |  | 21 |
| 13 |  |  | 22 |

Note that the lists are not of equal size. This may occur due to the prior sort operation involving a selective sort of the original list. The list might have had elements not desired to be included in the final sorted list. A one-half partition is to be found. At the beginning, there are no elements to be considered because none have been added. A first calculation is done to determine what elements from what lists will be included for consideration. List a has 12 elements, b has 3 elements, and c has 13 elements. Since elements are added for consideration half-way between previous elements, the eighth element in each of the lists will be added. The eighth element was chosen first because it is a power of two, and there are more than eight elements in at least one of the lists, but less than sixteen in all of the lists. It is simply easier to include further elements based on a power of two. Since there are only three elements in the second list c, it is not necessary to consider any of the elements in list c at this time.

When the first elements are added for consideration, they are added as part of the lower partition. Thus, the partition boundary represented by the line is as shown:

```
    a       b       c
_____
    8               17
```

The largest element being considered in the upper partition is found. This is necessary to determine how many elements must be placed in the upper partition because they are less than the maximum value that currently resides there. There are no elements in the upper partition so the maximum is considered to be minus infinity or, more practically, the minimum machine value. There are no elements under consideration below the current boundary which are less than the maximum value above the boundary. Therefore, no elements need to be moved due to the magnitude requirement, s. s is equal to zero. Next, the number of elements, n, which must be moved into the upper partition to equalize the partition size is calculated. n is found to be one. The relative values of s and n are now used to determine how to move the partition boundary. There are three different ways to move the boundary delineated as Case 1, Case 2, and Case 3. When s is less than n, Case 3 is executed. The operation of the other cases will be described as encountered during this example. Case 3 includes the minimum s elements from the lower partition in the upper partition. Then the n-s smallest elements in the lower partition are excluded from the lower partition and placed in the upper partition. Since s was zero, no elements from the lower partition are added to the upper partition. n-s is one, so the value 8 from list a rises into the upper partition. The partition now appears as follows:

```
    a       b       c
           _____
    8   |   17
_____|
```

For the second iteration, again only lists a and c will participate. Elements 4 and 12 from each list are added for consideration. These elements are halfway between the elements presently under consideration. It is important to note that the partition boundary in list c is considered to be above the value 17, and in fact at minus infinity after the first iteration. Therefore, the value 7 was added below the boundary.

```
    a       b       c
           _____
    4   |       7
    8   |       17
_____|
    20          21
```

It is seen that the largest magnitude above the partition is eight, and that there is one smaller element, 7, below the partition presently being considered. Thus, the 7 must be moved into the upper partition to satisfy the magnitude requirement and s=1. Also, it is evident that one element must be moved into the upper partition to satisfy the partition-size requirement so n=1.

s=n is a Case 1 situation. Case 1 includes the minimum s elements from the lower partition in the upper partition. This is all that need be done since s elements must be placed in the upper partition to satisfy the magnitude requirement and the same number of elements need be placed there to equalize the size of the partitions. As stated, since s and n are both 1, one element needs to be moved into the upper partition and the resulting partition is:

```
    a       b       c
    4               7
    8               17
    20              21
```

During the next iteration, elements 2, 6, and 10 are added for consideration. Again, they are the elements halfway between the elements already under consideration. This results in the elements being considered, and the boundary as follows:

```
    a       b       c
    2       6       6
    4               7
    6               7
    8               17
    8               18
    20              21
```

List b has now joined the participating lists. The maximum value above the partition is 8, in list a, index 8. s is two, which indicates that two elements must be moved into the upper partition to satisfy the magnitude requirement. These elements are 6 at b2 and 7 at c6. n is found to be one, indicating that one additional element is needed in the upper partition to satisfy the partition-size requirement. s is greater than n, so this is an instance of Case 2. Two elements are moved into the upper partition, and s-n elements, one element, are moved into the lower partition. The partition now appears as:

```
    a       b       c
    2       6       6
    4               7
    6               7
    8               17
    8               18
    20              21
```

Finally, it is time for the last iteration, since this time all of the elements will be considered. When added, the partition now appears as:

```
    a       b       c
    1       6       6
    2       6       6
    3               6
    4       22      7
    5               7
    6               7
    7               16
    8               17
    8               18
    8               18
    8               18
    20              21
                    22
```

It is seen that the largest magnitude above the partition is seven, and that there are no smaller elements below the partition presently being considered. Also, since the number of elements above and below the partition is equal, there is no need to move any of the elements. s=0, and n=0. s=n so this is another Case 1 situation. Since s and n are both 0, no change needs to be made in the partition.

The upper partition now contains 14 elements, all of which are less than or equal to the lowest magnitude element of the fourteen element lower partition. One processor now takes the elements in the upper partition, and merges the two sixes from list b, indexes 1 and 2 into list a, then the three sixes and three sevens from list c, indexes 1 through 6, are merged into list a. A similar process occurs for the lower partition and the two merged partitions are catenated to produce the final sorted list.

In general, the processes used to determine the magnitude s, and size n requirements are designed to minimize the amount of storage activity required. Some lists are very large, and do not fit entirely within the shared main storage. They must constantly be paged into and out of the main storage. If this can be avoided, time is saved, and resources are free for other processors. Since the iterations add only a few items on either side of the previous partition, and sometimes elements from a list are not included, the process determines which elements actually need to be looked at. This leads to a reduction in the number of elements which must actually be present in main storage. Also, since each of the processors is working on a different partition, there may be fewer conflicts in accessing data.

In partitioning, only the P elements immediately following the partition boundary need be inspected each iteration. For example, in the last iteration of the example above, elements {1,3,5,7,8,8} were added from list a, elements {6,22} were added from list b, and elements {6,6,7,16,18,18,22} were added from list c. Of the 15 elements added only the elements immediately following the partition boundary, {7,22,16}, need be actually paged. The remaining elements need not be inspected or paged at all. We know they are already in the appropriate partition. Time for partitioning is proportional to $P*(1+\log_2(P))*\log_2(N/P)$ where N is the total number of elements to be sorted. Note that for N>>P, the typical case in sorting operations, the cost of partitioning is insignificant and can be ignored when compared to the cost of merging. Thus, since this method results in an exact partitioning of the lists, there is never any processor load imbalance and merge time is nearly proportional to N/P.

To give a better idea of the process as it relates to creating multiple partitions, a side by side view of the iterations done by two processors to create two boundaries, and hence three partitions is now shown. The maximum value, s, n and the case number are shown. Again, n is the value that is dependent on the partition boundary desired. It is a function of the percentage of elements to be included above the partition boundary being found by a particular processor. In this example, processor 1 will find a boundary having about 33 percent of the elements above the boundary, and processor 2 will find the next boundary which has about 66 percent of the elements above the boundary.

```
Processor 1                     Processor 2
1/3 partition                   2/3 partition
Iteration 1 add elements a    b    c                 a    b    c 8        17                 8        17

S=0  N=1  CASE3                 S=0  N=1  CASE3
max= -infinity                  max= -Infinity
create new partition
```

```
Iteration 2 add elements a    b    c                 a    b    c 4        13                 4        13
         8        17                 8        17 s=0  n=-1  max=8  case2         s=0  n=1  max=8  case3
create new partition
                                          13
         4        13                 8        17
         8        
         17
```

Iteration 3 add elements

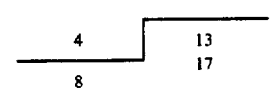

```
    a    b    c                 a    b    c 2    9    8                 2    9    8
    4        13                 4        13
                                6
    6        15                 8        15
    8        17                          17
             21                          21 s=0  n=1  max=4  case3          s=1  n=1  max=13  case1
create new partition
```

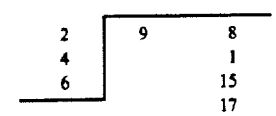

Iteration 4 add elements

| a | b | c |   | a | b | c |
|---|---|---|---|---|---|---|
| 1 | 9 | 8 |   | 1 | 9 | 8 |
| 2 | 9 | 8 |   | 2 | 9 | 8 |
| 3 | 22| 12|   | 3 | 22| 12|
| 4 |   | 13|   | 4 |   | 13|
| 5 |   | 14|   | 5 |   | 14|
| 6 |   | 15|   | 6 |   | 15|
| 7 |   | 16|   | 7 |   | 16|
| 8 |   | 17|   | 8 |   | 17|
| 20|   | 18|   | 20|   | 18|
|   |   | 21|   |   |   | 21| s=0  n=1  max=6  case3          s=0  n=1  max=13  case3 create final partition

| | | |   | | | |
|---|---|---|---|---|---|---|
| 1 | 9 | 8 |   |   | 9 | 8 |
| 2 | 9 | 8 |   | 1 | 9 | 8 |
| 3 | 22| 12|   | 2 |   | 12|
| 4 |   | 13|   | 3 | 22| 13|
| 5 |   | 14|   | 4 |   | 14|
| 6 |   | 15|   | 5 |   |   |
| 7 |   | 16|   | 6 |   | 15|
|   |   |   |   | 7 |   | 16|
| 8 |   | 17|   | 8 |   | 17|
| 20|   | 18|   |   |   | 18|
|   |   | 21|   | 20|   | 21|

When processor 1 completes the process of finding the partition boundary, it passes on the identification of it in the form of list, index, in this case, a7, b0, c0 to processor 2. Processor 2 then knows that the second partition comprises the elements at a8, b1, c1 plus those up to the boundary that it found, a8, b2, c5. Processor 2 passes on secondary boundary definition to a third processor, which then knows what elements it must merge. Each of the processors then performs the merge operation to obtain lists which may merely be strung together to form the final sorted list.

It can be seen from the above description that the invention efficiently partitions lists of almost any size in parallel. Much improvement is obtained in total sort time due to the addition of processors because each of the steps involves multiple processors, and the partitioning phase involves only a limited predetermined number of steps given the size of the largest list.

A flow diagram in FIG. 2A, 2B, 2C, 2D, 2E, 2F, and 2G shows a preferred flow for the coding of the method of partitioning. First, the sorted lists are acquired, and the number of iterations required are calculated. Then elements are added to be considered, s, n, and the max are calculated for the considered elements, and the case number is determined and branched to. The elements are then moved in accordance with the previous description. This is repeated until all elements have been considered. The flow diagram represents one way in which the invention may be implemented. It is not meant to be all inclusive of the ways in which it may be coded. A hardware implementation is quite possible and would likely be faster.

Figure 3A:
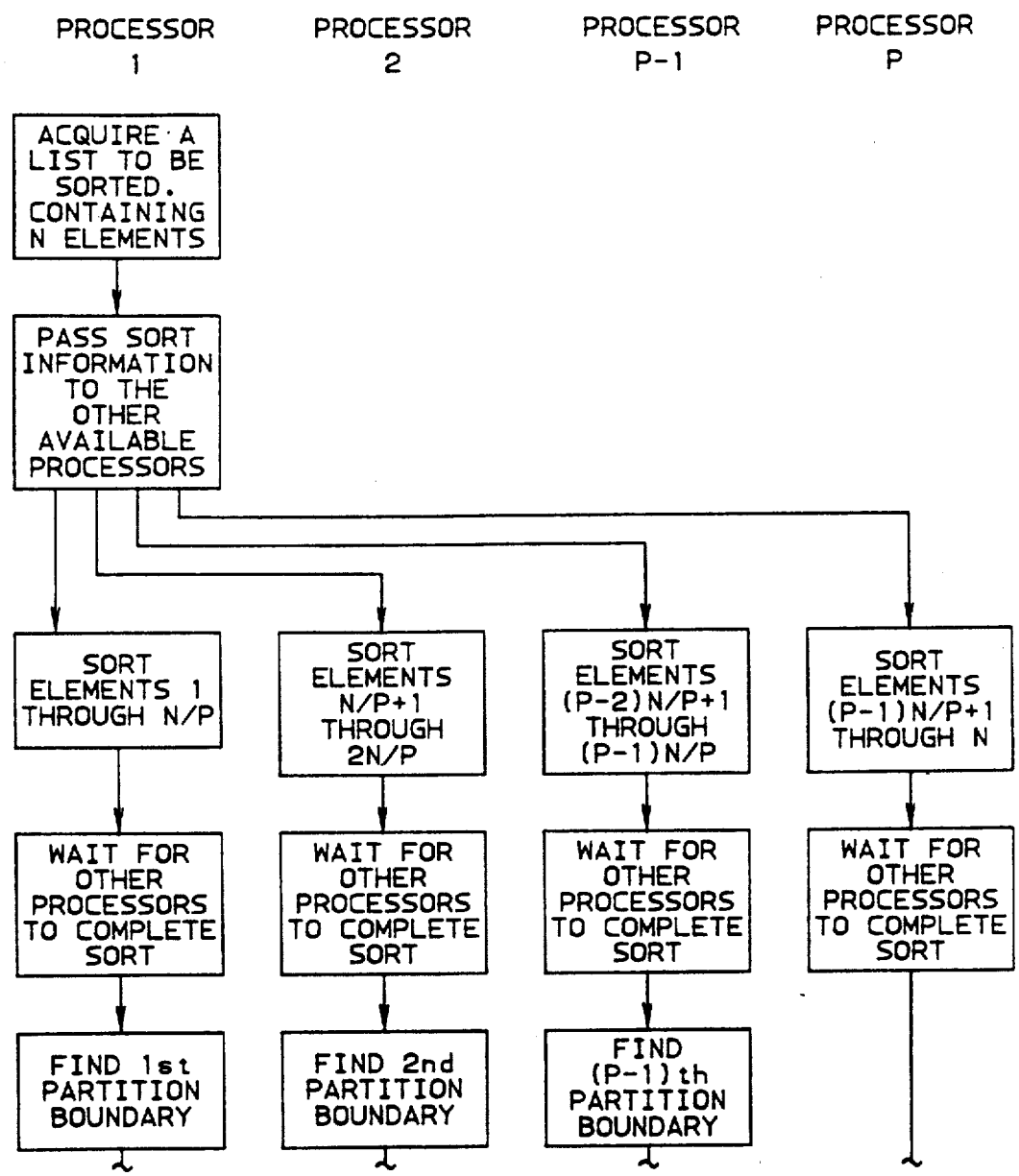
FIG. 3A and 3B, when placed end to end, represent a flow diagram of the entire sorting process using multiple processors.
Figure 3B:
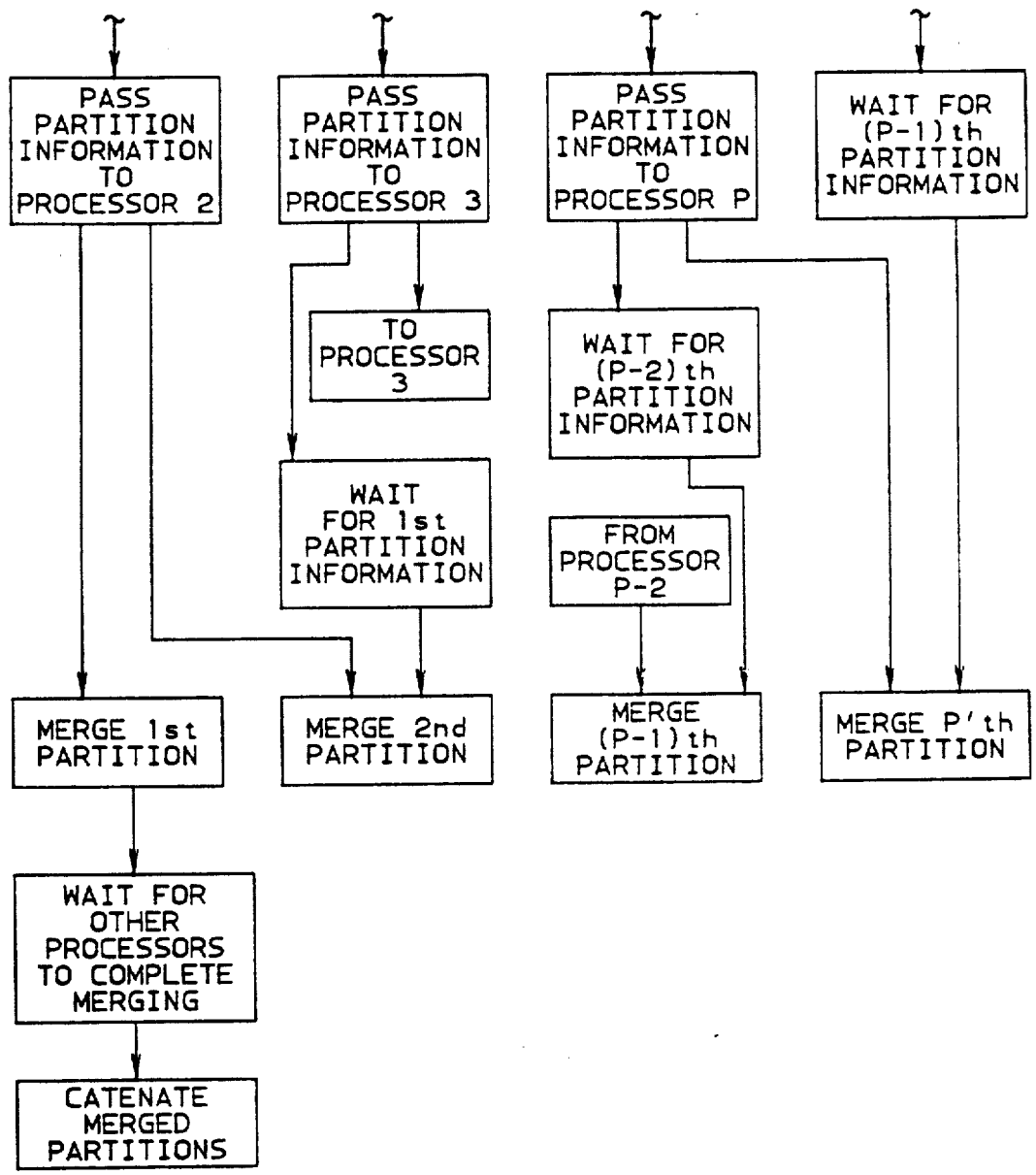

A block diagram of the method of sorting a list using multiple processors is shown in FIG. 3A and 3B when placed end to end. Multiple processors 1, 2 ... P−1, P are shown at the top of the figure, and the actions taken are directly in line beneath each of the processors. One of the processors, processor 1 acquires a list to be sorted containing N elements. It passes the sort information to the other processors, identifying which elements of the list are to be sorted by each of the processors. The elements to sort may also be determined by each processor if each processor has been preprogrammed to search predetermined portions given the size of a list.

Each processor will then sort a portion of the list, and wait for the other processor to complete their sorts. The lists are sorted using a traditional sorting method such as quicksort, tournament tree, etc. Following the sort, P−1 of the processors will determine partition boundaries, and pass the partition information to the processor which is determining the next partition boundary. During the partitioning, processors will also need to perform sorts to determine which elements to move about the boundaries during the iterative process. Similar sorting methods as described above may be used. The amount of sorting is minimal since the lists are already individually sorted.

The processors will wait for the partition boundary information from the preceding processor. When both boundaries are identified, each of the processors will then merge one of the partitions which is defined by the boundaries. A designated processor, processor 1 in this case, will then wait for the other processors to complete the merge of their respective partitions, and then catenate the merged partitions. The result is the actual list. This result may be simply a list of addresses of the elements in the correct order, or the elements may actually be rearranged in storage to be in the correct order.

While the invention has been described with respect to preferred and alternate embodiments, it will be understood by those skilled in the art that various changes in detail may be made therein without departing from the spirit, scope and teaching of the invention. Accordingly, the herein disclosed is to be limited only as specified in the following claims.

What is claimed is:

1. A computer implemented method of partitioning P sorted lists by L−1 processors into L partitions, where each of the processors has access to storage containing the sorted lists and where P is greater than 2 and L is greater than or equal to 2 and each successive partition of elements contains only elements having a value greater than all the elements of the preceding partition, the computer implemented method comprising the steps of:
    a) accessing said storage to obtain at least one row of elements from the sorted lists for consideration, the accessing step being performed by each of the processors;
    b) fixing a partition boundary within the sorted lists, the partition boundary being fixed based on the number of processors that are to perform the partitioning, the fixing step being performed by each of the processors;
    c) determining the maximum value of all the elements under consideration above the partition boundary, the determining the maximum value step being performed by each of the processors;
    d) determining the elements under consideration below the partition boundary that have a value which is less than the maximum value, the determining the elements step being performed by each of the processors;
    e) moving the elements about the partition boundary based on the size of the partition and the values of the elements under consideration, the moving step being performed by each of the processors; and
    f) repeating steps a, c, d, and e until all successive rows have been considered, and the partitions each contain substantially the same number of elements.

2. The method of claim 1 wherein the first row of elements selected has an index which is the greatest integer power of 2 less than the number of elements in the longest sorted list.

3. The method of claim 2 wherein the next elements selected for consideration when steps a, c, d, and e are repeated include the two rows having indexes halfway between the index of the first row and zero, and halfway between the index of the first row and the next higher power of two.

4. The method of claim 2 wherein each repetition of steps a, c, d, and e result in the selection of all elements which lie halfway between the elements previously considered.

5. The method of claim 1 wherein the elements are moved in three different ways, case 1, case 2, and case 3 dependent upon the relationship between the size of the partition and the number of elements below the partition boundary that are below the maximum value.

6. The method of claim 5 wherein the movement of elements in case 1 occurs in the following steps:
    moving the number of elements determined in step d from below the partition boundary to above the partition boundary.

7. The method of claim 5 wherein the movement of elements in case 2 occurs in the following steps:
    moving the number of elements determined in step d from below the partition boundary to above the partition boundary;
    determining the number of elements which should be moved to make the partitions the correct size; and
    moving the number of elements determined in step d minus the number of elements to be moved to make the partitions the correct size from above the partition boundary to below the partition boundary.

8. The method of claim 5 wherein the movement of elements in case 3 occurs in the following steps:
    moving the number of elements determined in step d from below the partition boundary to above the partition boundary;
    determining the number of elements which should be moved to make the partitions the correct size; and
    moving the number of elements to be moved to make the partitions the correct size minus the number of elements determined in step d from below the partition boundary to above the partition boundary.

9. A computer implemented method of sorting a list of N elements using P processors, where P is an integer greater than 2, and wherein the processors, each having access to storage containing the list, cooperate in parallel to provide the sorted list, the computer implemented method comprising the steps of:
    a) accessing the list from said storage;
    b) dividing the accessed list into P sub-lists of approximately N/P elements, the sub-lists residing in said storage;
    c) each processor accessing and sorting one of the sub-lists, the sorted sub-lists residing in said storage,
    d) each processor accessing the sorted sub-lists upon completion of the sorting step;

e) defining P−1 partition boundaries, each of the partition boundaries being defined by one of P−1 of the processors, said partition boundaries dividing the lists into nearly equal partitions of elements having values less than all of the elements of a succeeding partition; and f) each of the processors merging one of the partitions.

10. Apparatus for partitioning multiple presorted lists of elements comprising:

a plurality of processors each having access to storage containing the presorted lists, each processor comprising:

means for accessing said storage to obtain said presorted lists;

means for selectively and iteratively adding elements from said presorted lists to a partitioning list, said means for selectively and iteratively adding being coupled with said means for accessing;

means for selecting an initial partition boundary for said partitioning list, said means for selecting being coupled with said means for accessing;

means for determining a size modifier based on the desired number of elements above the partition boundary versus the actual number of elements above the partition boundary, said means for determining a size modifier being coupled with said means for accessing;

means for determining a magnitude modifier based on the number of elements below the partition boundary which are less than the magnitude of the largest element above the partition boundary, said means for determining a magnitude modifier being coupled with said means for accessing; and means for modifying the partition boundary as a function of said size modifier and said magnitude modifier following each iterative addition of elements, said means for modifying being coupled with said means for accessing.

11. Apparatus for partitioning multiple presorted lists of elements comprising:

a plurality of processors each having access to storage containing the presorted lists, each processor comprising:

means for accessing said storage to obtain said presorted lists;

means for selectively and iteratively adding elements from said presorted lists to a partitioning list, said means for selectively and iteratively adding being coupled with said means for accessing;

means for selecting an initial partition boundary for the partitioning list, said means for selecting being coupled with said means for accessing;

means for determining a size modifier, said means for determining a size modifier being coupled with said means for accessing;

means for determining a magnitude modifier, said means for determining a magnitude modifier being coupled with said means for accessing; and means for modifying the partition boundary as a function of the size modifier and magnitude modifier following each iterative addition of elements, said means for modifying being coupled with said means for accessing.

12. The apparatus of claim 11 and further comprising:

means for identifying the movement of elements about the partition boundary as a case 1 situation when the magnitude modifier and the size modifier are equal;

means for identifying the movement of elements about the partition boundary as a case 2 situation when the magnitude modifier is greater than the size modifier; and means for identifying the movement of elements about the partition boundary as a case 3 situation when the magnitude modifier is less than the size modifier.

13. The apparatus of claim 12 wherein the magnitude modifier is an integer s, and the size modifier is an integer n and wherein the apparatus further comprises:

means for moving s elements from below the partition boundary to above the partition boundary in the event of case 1;

means for moving s elements form below the partition boundary to above the partition boundary, and s-n elements from above the partition boundary to below the partition boundary in the event of case 2; and means for moving s elements from below the partition boundary to above the partition boundary, and n-s elements from below the partition boundary to above the partition boundary in the event of case 3.

14. The apparatus of claim 11 wherein the rows of elements based on an index are added to said partitioning list, and the first row added has an index which is the greatest integer power of 2 less than the number of elements in the longest presorted list.

15. The method of claim 14 wherein the next row of elements added for the second iteration comprise the two rows having indexes halfway between the index of the first row added and zero, and halfway between the index of the first row added and the next higher power of two.

16. The method of claim 14 wherein each iteration of adding rows, results in the addition of rows of elements which lie halfway between the rows of elements previously considered.

* * * * *